United States Patent [19]

Williams et al.

[11] Patent Number: 5,762,320
[45] Date of Patent: Jun. 9, 1998

[54] SEAT FOR GATE VALVE

[75] Inventors: Michael R. Williams, Houston; Lien-Yan Chen, Spring, both of Tex.

[73] Assignee: FMC Corporation, Chicago, Ill.

[21] Appl. No.: 699,369

[22] Filed: Aug. 19, 1996

[51] Int. Cl.$^6$ .................................................. F16K 3/00
[52] U.S. Cl. .................................... 251/328; 251/326
[58] Field of Search ........................... 251/328, 326

[56] References Cited

U.S. PATENT DOCUMENTS 4,377,273  3/1983  Beson .............................. 251/328
4,771,805  9/1988  Maa ................................. 251/328
5,346,179  9/1994  Lochmann ...................... 251/328

*Primary Examiner*—Denise L. Ferensic
*Assistant Examiner*—Joanne Y. Kim
*Attorney, Agent, or Firm*—Henry C. Query, Jr.

[57] ABSTRACT

A gate valve is disclosed which includes a modified valve seat designed to reduce stress concentrations and wear between the gate and the valve seat. The valve seat includes a relief groove positioned on the inner diameter of the valve seat relatively close to the seating surface of the valve seat.

19 Claims, 2 Drawing Sheets

FIG_1 (PRIOR ART)
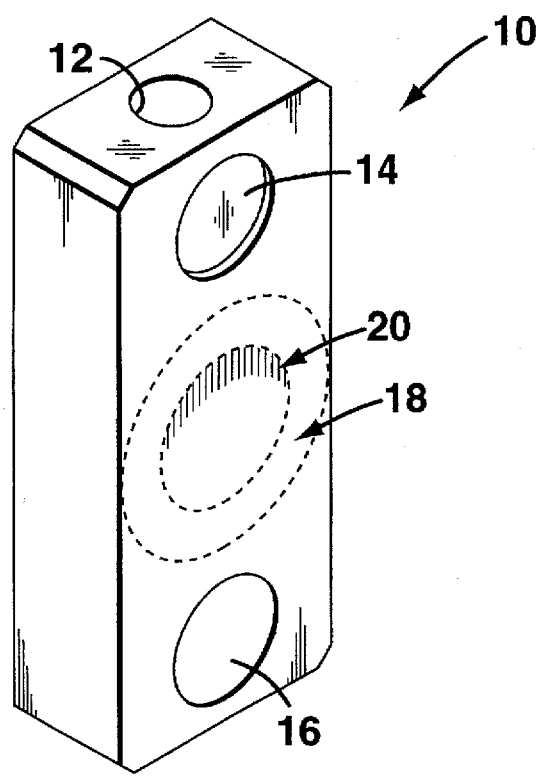
FIG_3
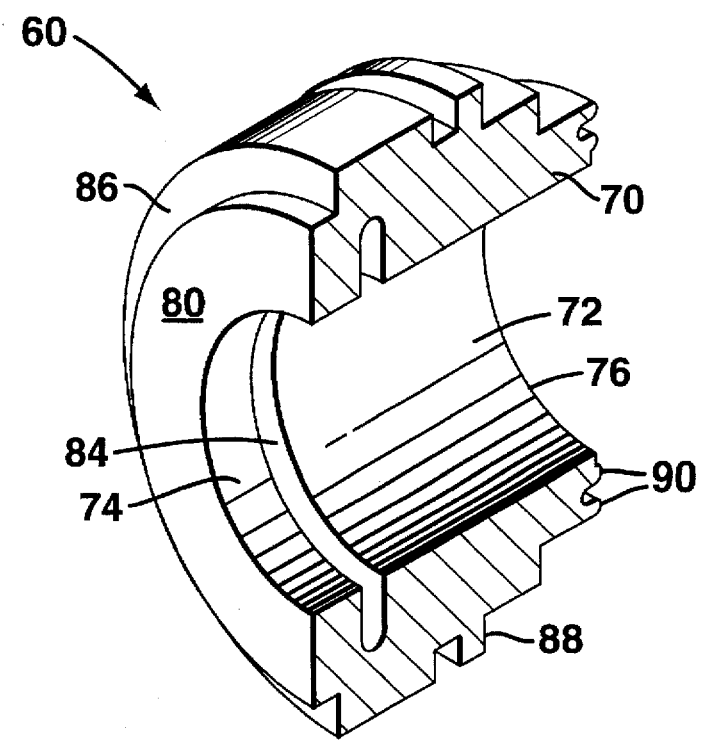

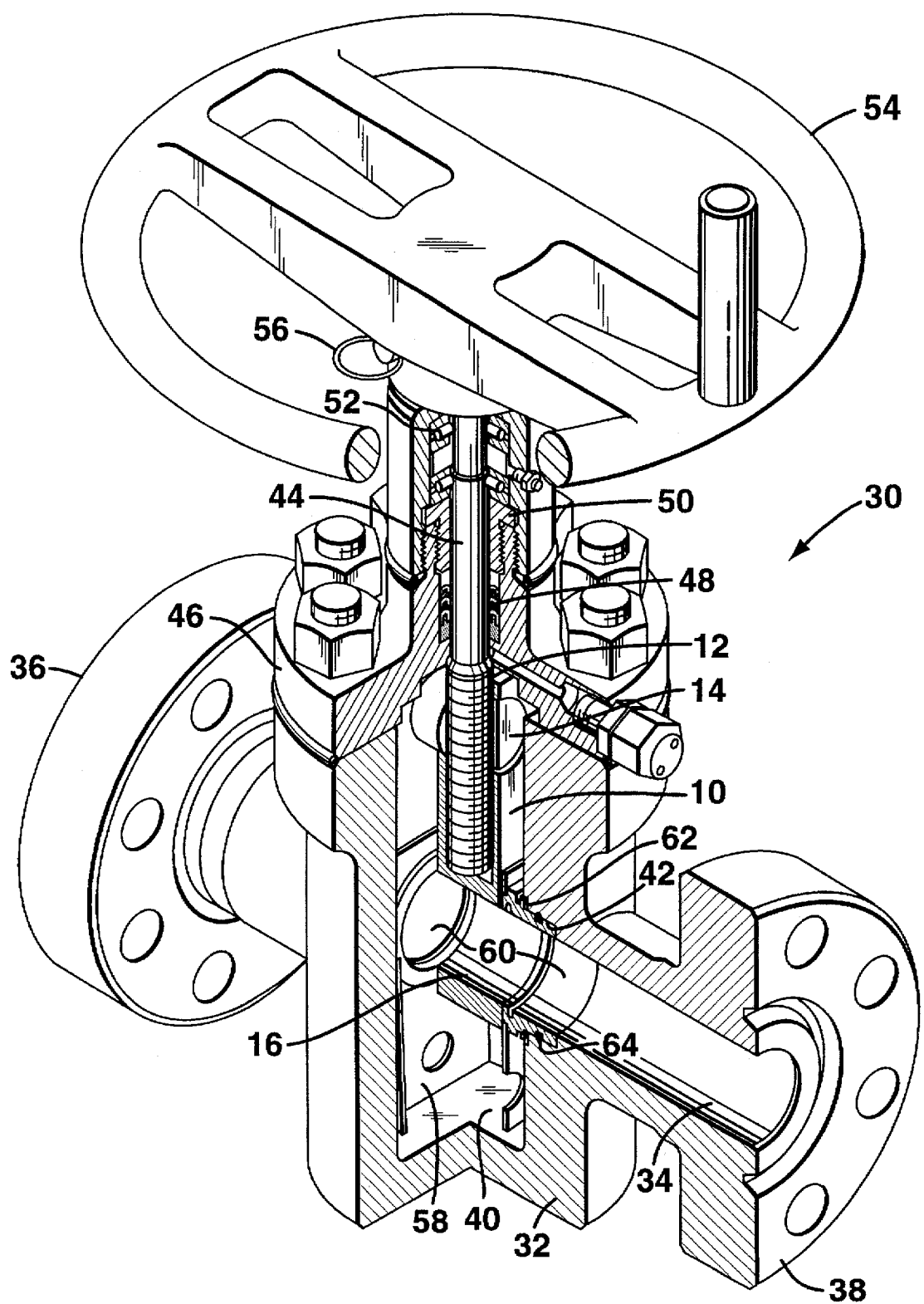
FIG_2

SEAT FOR GATE VALVE

BACKGROUND OF THE INVENTION

1. Field of the Invention

The present invention relates to gate valves and, more specifically, to a valve seat for use in a gate valve for reducing the wear between the gate and the valve seat.

2. Description of Related Art

Gate valves are utilized in the petroleum and gas industries. With an increasing number of high-pressure/high temperature petroleum wells being developed in several areas of the world, gate valves having larger bores and suitable for operation under higher pressures and higher temperatures are required. These larger bore, higher pressure and temperature gate valves have developed problems relating to gate and valve seat hard-facing failure. Failure due to highly localized wear and galling of the mating surfaces of the gate and valve seat is common in these gate valves. Testing and analysis of such gate valves has revealed that, due to extremely high friction forces acting between the gate and the face of the valve seat, the valve seat twists during operation such that the inside diameter edge of the bore in the valve seat "claws" against the surface of the gate, creating a crescent-shaped area of wear and galling. The prior art has attempted to compensate for this problem with improved gate and valve seat hard-facing materials. These efforts have only met with limited success. Additionally, there is a practical limit on the ability of improvements in hard-facing materials to provide a solution to this problem.

SUMMARY OF THE INVENTION

It is an object of the present invention to overcome the aforementioned drawbacks of the prior art. It is a further object of the present invention to provide a valve seat which greatly reduces the localized wear and galling found on prior art large diameter, high-pressure and/or high temperature gate valves.

The objects of the present invention are satisfied by providing a gate valve which comprises a valve body having a fluid flow passage extending therethrough including an inlet, an outlet, a gate chamber positioned between the inlet and the outlet and a pair of valve seat counter bores; a gate movably positioned in the gate chamber and having a port therethrough; a valve seat positioned within each valve seat counter bore; each valve seat including a valve seat body, an inner passage extending through the valve seat body, a seating surface on one end of the valve seat body and a relief groove formed in the inner passage near the seating surface; and a mechanism for moving the gate from a closed position, wherein the gate abuts against the seating surface of each valve seat to close off the inner passages, to an open position, wherein the port of the gate is aligned with the inner passages to thereby open the fluid flow passage.

According to one, non-limiting embodiment of the present invention, the distance from the seating surface to the relief groove in each valve seat is approximately equal to the depth of the groove, and the width of the groove is less than the depth of the groove. In one embodiment of the present invention, the depth of the relief groove in each valve seat is less than 50%, and preferably about 45%, of the thickness of the valve seat as measured between the diameter of the outer surface of the valve seat and the diameter of the inner passage in the plane of the relief groove.

In one non-limiting embodiment of the present invention, the diameter of the inner passage of each valve seat is about 8", and the width of the relief groove is about 0.1", the depth of the groove is about 0.37" and the groove is positioned about 0.37" from the seating surface.

These and other objects and advantages of the present invention will be clarified in the description of the preferred embodiment together with the attached drawings, wherein like reference numerals indicate like elements throughout.

BRIEF DESCRIPTION OF THE DRAWINGS

FIG. 1 is a prior art gate showing the shape and location of high wear and galling;

FIG. 2 is a cross-sectional view of a gate valve according to the present invention; and FIG. 3 is a cross-sectional view of the valve seat shown in FIG. 2.

DETAILED DESCRIPTION OF THE PREFERRED EMBODIMENT

Referring to FIG. 1, a gate 10 of a typical gate valve is shown which illustrates a typical mode of failure often found in higher pressure oil field gate valves utilizing conventional valve seat designs. The gate 10 includes a valve stem receiving bore 12 extending into one end of the gate 10, a replaceable gate lift nut 14 which threadably engages the valve stem, and a port 16 extending through the gate 10. A footprint 18 of a valve seat against the gate 10 when the gate valve is in the closed position is shown in phantom. In prior art gate valves, a worn or galled portion or wear pattern 20 is often found in a localized crescent moon-shaped area adjacent the inner diameter of the seat.

The mode of failure represented by wear pattern 20 is related to distortion of the valve seat during operation. Analysis of conventional valve seats suggests that significant contact stress concentrations are produced in the areas where the high wear and galling have been observed in the gate 10. Movement of gate 10 across the top surface of the valve seat produces significant deflection of the valve seat. The friction resulting from the movement of gate 10 reacts against the end of the valve seat adjacent gate 10, while the valve seat is restrained at its opposite end by the valve body seat pocket or bore. These offset forces are believed to produce a twisting action of the valve seat which causes the inner diameter of the valve seat to twist up and into the gate 10. The wear pattern 20 of the gate 10 clearly corresponds to this proposed valve seat twisting, whereby the leading edge of the seating surface tends to dig into the face of the gate 10.

In the present invention, we have found that by adding a relief groove in the inner diameter of the valve seat positioned in a proper location, it is possible to decouple the motions of the valve seating surface from those of the main body of the valve seat. This allows the seating surface of the valve seat to remain essentially flat against the gate, even if the main body of the valve seat twists during actuation.

Referring to FIG. 2, a gate valve 30 according to the present invention includes a valve body 32 having a fluid flow passage 34 extending therethrough from an inlet 36 to an outlet 38. The passage 34 includes a gate chamber 40 positioned between the inlet 36 and the outlet 38 and extending substantially perpendicular to the longitudinal axis of the passage 34. The passage 34 additionally includes a pair of valve seat counter bores 42. The gate valve 30 includes a gate 10 having a valve stem receiving bore 12, a gate lift nut 14 and a port 16. The gate 10 is slidably positioned within the gate chamber 40 and moved by rotation of a rotatable stem 44 which threadably engages the gate lift nut 14. The stem 44 is supported by a bonnet assembly 46 which is bolted to the valve body 32. The bonnet assembly 46 includes a stem packing, 48 secured by a sealed packing nut 50. The rotatable stern 44 is supported by stem bearings 52 and is rotated by actuating handle 54. A quick release pin 56 may be provided between the handle 54 and the rotatable stem 44. A pair of gate guides 58 is also provided in the gate chamber 40.

A pair of valve seats 60 is provided on either side of the gate 10 with each valve seat 60 positioned in a respective one of the valve seat counter bores 42. A spring 62 may be provided between the valve body 32 and the valve seat 60 to bias the valve seat into engagement with the gate 10. A seal 64 is provided between each valve seat 60 and the valve body 32.

FIG. 3 shows a cross-sectional enlarged view of a valve seat 60 according to the present invention. The valve seat 60 includes a substantially cylindrical valve seat body 70 having a substantially cylindrical inner passage 72 extending through the valve seat body 70 from a first opening 74 to a second opening 76 on opposed ends of the valve seat body 70. Although the valve seat body 70 and passage 72 are shown as substantially cylindrical, other configurations are possible. A planar seating surface 80 is provided on one end of the valve seat body 70 to be positioned adjacent and abut against the gate 10. The seating surface 80 surrounds the first opening 74.

According to the present invention, the valve seat 60 includes a relief groove 84 formed in the inner passage 72 near the seating surface 80. Preferably, the relief groove 84 is spaced from the seating surface 80 a distance approximately equal to the depth of the relief groove 84. The relief groove 84 is of a width preferably less than the depth of the relief groove 84. Additionally, the depth of the relief groove 84 is preferably less than one-half of the difference between the outer diameter of the valve seat body 70 and the diameter of passage 72 as measured in the plane of the relief groove 84. Preferably, the depth of the relief groove 84 is about 45% of this distance. Specifically, where the passage 72 has a diameter of about 8", the relief groove 84 is preferably spaced from the seating surface 80 about 0.37" and has a width of about 0.1", depth of about 0.37" and an end portion radius of about 0.05". This type of relief groove has been found to relieve the high contact stresses associated with prior art valve seats.

The valve seat 60 additionally includes a stepped cutout 86 for receiving the gate guides 58. The stepped cutout 86 has a dimension greater than the thickness of the gate guides 58 such that the seating surface 80 can effectively seat against the gate 10. The valve seat 60 additionally includes a shoulder 88 for abutting against the spring 62 and a double bump profile 90 for creating a metal-to-metal seal with the valve body 32. A single bump profile could also be effectively utilized in the valve seat 60. The valve seat 60 and gate 10 may be formed from 410 hard-surfaced stainless steel or 4130 steel which is hard-surfaced or nitrided. Other conventional materials may also be utilized to form the gate 10 and valve seat 60.

In operation, the gate valve 30 operates in a conventional fashion; however, the relief groove 84 allows the seating surface 80 to maintain a flush engagement with the gate 10 even if the remaining portions of the valve seat are twisted due to high operational forces. This even engagement of the seating surface 80 will prevent wear or galling in the gate 10.

Although the best mode contemplated for carrying out the present invention has been herein shown and described, it would be apparent to those of ordinary skill in the art that various modifications and variations can be made to the present invention without departing from the spirit and scope thereof.

What is claimed is:

1. A valve seat for a gate valve, said seat comprising:
   a valve seat body having first and second openings formed therein;
   an inner passage extending through said valve seat body from said first opening to said second opening;
   a seating surface on an end of said valve seat body surrounding said first opening; and
   a relief groove formed in said inner passage substantially entirely around said inner passage and extending into said valve seat body away from said inner passage.

2. A valve seal according to claim 1 wherein said inner passage is substantially cylindrical.

3. A valve seating according to claim 1 wherein said valve seat body is substantially cylindrical.

4. A valve seat according to claim 1 wherein the depth of said relief groove is substantially equal to the distance between said seating surface and said relief groove.

5. A valve seat according to claim 1 wherein the depth of said relief groove is less than one-half of the distance between an outer diameter of said valve seat body and a diameter of said inner passage measured in the plane of said groove.

6. The valve seat according to claim 1 wherein the width of said relief groove is less than the depth of said relief groove.

7. The valve seat according to claim 1 wherein the diameter of said inner passage is about 8".

8. The valve seat according to claim 7 wherein the width of said relief groove is about 0.1".

9. The valve seat according to claim 8 wherein the depth of said relief groove is about 0.37".

10. The valve seat according to claim 9 wherein the distance between said relief groove and said seating surface is about 0.7".

11. A valve comprising:
    a valve body having a fluid flow passage extending therethrough, said passage including an inlet, an outlet, a gate chamber positioned between said inlet and said outlet, and a pair of valve seat counter bores;
    a gate movably positioned in said gate chamber, said gate having a port therethrough;
    a pair of valve seats, each said valve seat positioned within a respective one of said pair of valve seat counter bores, each said valve seat having a seating surface at one end of said valve seat, an inner passage extending through said valve seat from a first opening surrounded by said seating surface to a second opening on a second end of said valve seat, and a relief groove formed in each said valve seat substantially entirely around said inner passage and extending into said valve seat from said inner passage; and
    means for moving said gate between a first closed position wherein said gate closes off said inner passages of said valve seats and a second open position wherein said port of said gate is aligned with said inner passages of said valve seats.

12. A valve according to claim 11 wherein each said valve seat is substantially cylindrical.

13. A valve according to claim 11 wherein said inner passage of each said valve seat is substantially cylindrical.

14. A valve according to claim 11 wherein the distance from said seating surface to said relief groove is substantially equal to the depth of said relief groove.

15. A valve according to claim 14 wherein the width of said relief groove is less than the depth of said relief groove.

16. A valve according to claim 11 wherein the width of said relief groove is less than the depth of said relief groove.

17. A valve according to claim 11 wherein the depth of said relief groove is less than 50% of the thickness of said valve seat between an outer surface of said valve seat and a diameter of said inner passage in the plane of said groove.

18. The valve according to claim 17 wherein the depth of said relief groove is about 45% of said thickness of said valve seat.

19. The valve according to claim 11 wherein each said relief groove is about 0.1" wide, about 0.37" deep and spaced about 0.37" from said seating surface.

* * * * *